United States Patent [19]

Stoy et al.

[11] 3,948,870

[45] Apr. 6, 1976

[54] METHOD OF PREPARING HYDROPHILIC COPOLYMERS OF ACRYLONITRILE

[75] Inventors: Vladimir Stoy; Artur Stoy; Jaroslav Prokop; Renata Urbanova; Josef Kucera, all of Prague, Czechoslovakia

[73] Assignee: Ceskoslovenska akademie ved, Prague, Czechoslovakia

[22] Filed: Sept. 17, 1973

[21] Appl. No.: 397,744

[52] U.S. Cl. 260/85.5 R; 260/85.5 AM; 260/85.5 S
[51] Int. Cl.² ................... C08F 8/12; C08F 20/44
[58] Field of Search ... 260/85.5 R, 85.5 AM, 85.5 S

[56] References Cited
UNITED STATES PATENTS

| | | | |
|---|---|---|---|
| 3,200,102 | 8/1965 | Kleiner | 260/88.7 R |
| 3,410,941 | 11/1968 | Dagon et al. | 260/85.5 N |

Primary Examiner—Edward J. Smith

[57] ABSTRACT

There is disclosed a method of preparing hydrophilic copolymers of acrylonitrile by initially polymerizing acrylonitrile with about 0.01 to about 30% by weight of a monomer selected from the group consisting of acrylamide; methacrylamide; monomers of the formula $CH_2=CRCONHR^1$ wherein R is hydrogen or methyl and $R^1$ is hydrogen, methyl or ethyl; N,N-dialkylacrylamides and methacrylamides and N-alkylol amides, thereafter subjecting said copolymer to hydrolysis by an aqueous acidic solvent for the monomers or swelling agent for the polymer comprising at least one compound selected from the group consisting of nitric acid, sulfuric acid, phosphoric acid, formic acid, zinc chloride and zinc chloride/HCl mixtures and subsequent isolating the product thus formed by removal of the acidic hydrolytic agent therefrom. The products thereof possess such properties as high tensile strength and high swelling capacity and they are accordingly suitable for the production of fibers, membranes, tubing and the like.

14 Claims, No Drawings

METHOD OF PREPARING HYDROPHILIC COPOLYMERS OF ACRYLONITRILE

This invention relates to a method of preparing hydrophilic copolymers of acrylonitrile by the partial acidic homogeneous hydrolyzing of polyacrylonitrile. The invention relates more particularly to carrying out the process by subjecting a previously polymerized copolymer to hydrolysis or swelling in the presence of an acid and/or a metal chloride.

Homogeneous hydrolysis of acrylonitrile polymers with acids has been performed and described in the literature. For example, U.S. Pat. No. 2,721,113 describes hydrolysis with concentrated formic acid, U.S. Pat. No. 3,251,796 the hydrolysis of polyacrylonitrile solutions in concentrated aqueous solutions of zinc chloride, and U.S. Pat. No. 2,579,451 the hydrolysis with inorganic oxo-acids, such as nitric acid, sulfuric acid and phosphoric acid. The latter process consists of dissolving solid polyacrylonitrile (prepared by emulsion or precipitation polymerization) in an acid which is a solvent and simultaneously a hydrolytic agent, and maintaining the solution therein until the desired degree of hydrolysis has been achieved.

Another method of the hydrolysis, having numerous advantages, consists in polymerizing acrylonitrile directly in an acidic agent (such as aqueous solution of zinc chloride or nitric acid), the polymer thus formed being subjected to subsequent hydrolysis with the same acidic agent without, however, being isolated.

If prepared by homogeneous hydrolysis with acids, the products are mostly copolymers of acrylonitrile with acrylamide, as well as with acrylic acid. These copolymers due to their block structure have substantially different properties, compared with those copolymers prepared by copolymerization of acrylonitrile with acrylamide. Particularly, they have a higher tensile strength in a swelled state.

On the other hand, the hydrolysis of polyacrylonitrile takes a considerably longer time in comparison with direct copolymerization. Namely, the lower the temperature of hydrolysis, the better the properties of the product (at equal conversion of the hydrolysis).

It is accordingly an object of the instant invention to avoid one or more drawbacks of the prior art.

It is another object of the invention to provide for an improved method of preparing hydrophilic copolymers of acrylonitrile by partial acidic homogeneous hydrolysis of polyacrylonitrile.

Other objects and advantages of the instant invention will become more apparent as the description proceeds hereinafter.

Broadly speaking, the instant invention includes the provision of carrying out the method of preparing hydrophilic copolymers of acrylonitrile by partial homogeneous hydrolysis of acrylonitrile polymers in which acrylonitrile is first copolymerized with about 0.01 to about 30% by weight of the mixture of acrylamide and/or methacrylamide and thereafter subjecting the thus formed copolymer to hydrolysis with an acidic solvent or swelling agent including water and at least one other member selected from the group consisting of nitric acid, sulfuric acid, phosphoric acid, formic acid, zinc chloride and a mixture of zinc chloride and HCl, whereupon after the desired degree of the hydrolysis is achieved the product thus formed is isolated by removal of the acidic hydrolysis agent.

The method according to the present invention permits ready control of the resulting structure of the copolymer. Also, copolymers having a lower content of acrylamide units and a lower degree of hydrolysis are provided. Each amide unit incorporated into the molecular chain in advance provides one sequence of amide units, and their growth then starts simultaneously. Hence, the length and the number of the blocks at a given conversion may be controlled by proper choice of the initial composition of the copolymer. The rate of the reaction may be controlled by the initial composition as well as by the temperature under which hydrolysis is carried out.

The present invention may be utilized where the copolymerization and hydrolysis are carried out separately, i.e., first the copolymer is prepared (by precipitation or emulsion polymerization, isolated) and subsequently dissolved in an acid causing its hydrolysis. Inasmuch as the hydrolysis of acrylonitrile monomer in concentrated acids (e.g. in 65% nitric acid aqueous solution) is much slower than the hydrolysis of the copolymer the concentration of monomer units in the copolymer will be equal to that in the polymerizing mixture.

It has been found that the rate of homogeneous acidic hydrolysis is increased if acrylonitrile-acrylamide copolymer is hydrolyzed instead of a homopolymer of acrylonitrile or its copolymer with a monomer other than an acryl or methacrylamide. This is believed caused by the so-called "zip mechanism" of the hydrolysis, which results in the above-mentioned block structure of the thus formed copolymer. While not wishing to be bound by any particular theory or mechanism it is believed that the essential feature of this mechanism is that it proceeds in two reaction steps: in the first step, isolated amide groups are formed on the macromolecular chain by a slow primary reaction; while, in the second step new amide groups arise, formed by a much faster hydrolysis of nitrile groups neighboring the amide ones. The reason for this is believed to be the catalytic action of a protonized amide group on the adjoining nitrile one, arising either from the formation of a six-membered cyclic transition state, or from the breaking of a dipole pair, binding the nitrile group.

The result of incorporating amide groups into the molecular chain in advance of hydrolysis is to shorten the time of hydrolysis, since fewer such groups need to be formed in the first (slow) reaction step and because the secondary hydrolysis step, catalyzed by the neighboring amide group, requires lower activation energy; consequently the entire hydrolysis may be performed at even lower temperatures and takes a reasonably shorter reaction time than heretofore expected. The quality of the resultant products is thus enhanced. Further, if the hydrolysis is carried out in concentrated nitric acid, the hazard of an uncontrollable chain oxidation is decreased resulting in a significant decrease in molecular weight, formation of strong and poisonous nitrogen oxides, and the occurrence of bubbles. Such decomposition would otherwise occur if polyacrylonitrile prepared by precipitation polymerization, is dissolved in nitric acid.

It is noteworthy that since an acrylonitrile/acyl amide copolymer is more soluble than polyacrylonitrile above a further advantage is gained.

On the one hand, an extension of the range of concentration of the operable acids suitable for dissolving the starting acrylonitrile polymer, e.g. 55–70% nitric acid solution, 75–85 sulfuric acid solution or 98–100% phosphoric acid solution and, on the other hand, an increase in the concentration of the copolymer which can be dissolved in the acids. For example, polyacrylonitrile, as such, can be dissolved in sulfuric or phosphoric acids to form at most 5% solutions of polyacrylonitrile which, however, are not concentrated enough for spinning into fibers, tubes of the like. Likewise, the rate at which these copolymers are dissolved is much higher than that of pure polyacrylonitrile.

From the economical standpoint, it is usually advantageous to use a low concentration of acid and as high a concentration of polymer in the solution as possible, since the amount of acid (based on the weight of the polymer), which has to be subsequently recovered from the coagulation bath, should be as small as possible.

Broadly speaking the invention contemplates the preparation of hydrophilic copolymers of acrylonitrile by the partial acidic homogeneous hydrolysis of polyacrylonitrile polymers by working directly with a polymerized polymer. In any event, the hydrolysis is effected by an acid solvent for the monomers of the polymer (hydrolytic free agent) or swelling agent for the polymer from among the group as aforesaid. The amount of said agent employed will generally be about 50 to 95%, preferably 70 to 90% by weight. The concentration of the acid or strength thereof is generally 40 to 75%, preferably 50 to 65% for nitric acid; 60 to 95%, preferably 70 to 90% for sulfuric acid; 90 to 100%, preferably 94 to 99% for phosphoric acid; 70 to 100%, preferably 85 to 100% for formic acid; and where zinc chloride is employed, it is generally 40 to 95%, preferably 50 to 70% aqueous solution. The latter is preferably used in conjunction with HCl, optionally gaseous HCl; the concentration of the latter being 0.001 to 10%, preferably 0.5 to 5% relative to the zinc chloride.

A most preferred agent is 40–75% nitric acid solution or a greater then about 55% zinc chloride solution.

The copolymer to be hydrolyzed is ordinarily one of acrylonitrile with about 0.01 to about 30.0, preferably 0.1 to 10% methacrylamide or acrylamide. Other suitable comonomers also include those having the general formula:

wherein R is hydrogen or methyl and $R^1$ is hydrogen, methyl or ethyl. As aforesaid, advantageously, acrylamide or methacrylamide are employed, however, such monomers as, N,N-diethylacrylamide, N,N-dimethylmethacrylamide and N,N-diethyl-methacrylamide may also be utilized; as can be the N-methylolacrylamides and methacrylamides, the hydroxy substituted as well as hydroxyalkyl, aryl and alkanol substituted acrylamides and methacrylamides.

The N-alkylol amides of alpha,beta-olefinically unsaturated carboxylic acids embodied herein include those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type because of their ready availability and relative low cost are the N-alkylol amides of the alpha,beta-monoolefinically unsaturated monocarboxylic acids and the most preferred are N-methylol acrylamide and N-methylol methacrylamide where such monomers are employed.

The invention further contemplates preparing the copolymer by aqueous precipitation polymerization in the absence of a substantial amount of non-aqueous solvent for the copolymer, whereupon said copolymer is thereafter dissolved in the hydrolytic agent and then subjected to hydrolysis. It is of course to be understood, that the preparation of the copolymer is in accordance with procedures known in the art and need not be repeated herein. It is only where the copolymer is simultaneously produced and hydrolyzed that the method of making the copolymer is novel.

The hydrolysis step may be carried out at temperatures of about −25° to 50°C, preferably about −10 to about +20°C. Ordinarily the hydrolytic agent is removed from the reaction zone by coagulating the same in water or an aqueous solution; preferably said aqueous solution will be dilute. The agent may also be removed by washing the same with dilute aqueous solution of compounds operative to neutralize and preferably precipitate the same from the reaction zone. The operative compounds include urea, quanidine, ammoniac, ammonium or potassium hydrates and their salts with weak acids and other neutralizing agents employed in amounts of 0.1 to 25%, preferably 1 to 10% by weight.

By the term partial hydrolysis there is meant not full hydrolysis, but a hydrolysis from 1 to 98% conversion, i.e. from 2 to 99% of the originally present nitrile groups remaining unhydrolyzed. Homogeneous hydrolysis means that one of a copolymer which is either dissolved or uniformly swollen by the hydrolytic agent.

The following Examples are further illustrative of the present invention; and it will be understood, however, that the invention is not limited thereto. Each of the following Examples is divided into two parts: in the first one there is described the process according to the method known hitherto, in the second one there is given the process according to the present invention. All parts, proportions and ratios in the Examples as well as in the appended claims are by weight unless otherwise indicated.

EXAMPLE 1 a. 10 parts of powder-like polyacrylonitrile prepared by precipitation polymerization in water, are stirred with 250 parts of 75% sulfuric acid at 5°C. After 18 hours a homogeneous solution is obtained. The solution is maintained at 2°C, for an additional 30 hours and then spun into a large excess of water. It is determined (by elementary analysis) that after 48 hours (taken from the moment of adding the polymer to the acid) the copolymer contains 35.5 mol % of the amide units. After 24 hours the amide content is 9 mol %.

b. 9.5 parts acrylonitrile and 0.5 part acrylamide in an aqueous solution are polymerized, yielding a copolymer which is isolated, dried and ground. 10 parts of this copolymer are dissolved in 250 parts of 75% sulfuric acid at 5°C. A clear solution is obtained after 16 hours of continued heating and it is thereafter kept at 2°C for an additional 8 hours. Half of the solution is thereafter spun into a large excess of cold water. The second half of the solution is spun after a further 24 hours (i.e. 48 hours after the copolymer was added to the acid). The fiber thus obtained is washed, dried and ground. The content of the amide units is determined by means of elementary analysis. Copolymers of 9 parts acrylonitrile and 1 part acrylamide, and 8 parts acrylonitrile and 2 parts acrylamide are prepared and subsequently treated in the same way. The results are given in the following Table:

Table I

| Content of acryl amide in the monomer mixture | Time of dissolving, | Content of amide units in product, mol % | |
|---|---|---|---|
| | | after | after |
| % by weight | hours | 24 hrs. | 48 hrs. |
| 0 (part a) of Example 1 | 18 | 9 | 35.5 |
| 5 | 16 | 23 | 49 |
| 10 | 13 | 38.3 | 62.8 |
| 20 | 12 | 57.1 | 92.5 |

EXAMPLE 2 a. Polyacrylonitrile having average molecular weight of 175,000, is prepared by precipitation polymerization in water and is thereafter isolated therefrom, dried and ground. 10 parts of a fine powder thus obtained, are dissolved in 90 parts of 65% nitric acid. A small part of the solution is spun into a large excess of water, yielding samples of fiber which are then washed, dried, ground and analyzed. Contents of the nitrile, amide and carboxylic groups are determined. The following Table gives the results thus obtained; the conversion of the hydrolysis is set forth in molar percent, taken as the decrease of the acrylonitrile units:

Table II

| Temperature, | | | Time of the hydrolysis | | | |
|---|---|---|---|---|---|---|
| °C | 25 | 63 | 98 | 124 | 168 | 260 |
| 0 conversion of hydrolysis mol % | 0.85 | 2.50 | 3.45 | 3.75 | 4.40 | 5.55 |
| 20 | 6.0 | 13.1 | 20.5 | 33.6 | 67.0 | 98.6 |
| 40 | 14.2 | 39.8 | 60.1 | 85.5 | 97.2 | 99.3 | b. A series of acrylonitrile acrylamide copolymers, having an average molecular weight in the range of 150,000 – 250,000, are prepared by the precipitation polymerization of an aqueous solution of acrylonitrile-acrylamide mixtures with various ratios of the comonomers. These copolymers are isolated, dried and dissolved in 65% nitric acid at 0°C and 20°C, respectively, to form 10% by weight polymer solutions. Samples thereof are taken and the contents of the amide, nitrile and carboxylic groups are determined in the same way as in the Part (a) of this Example. The results are shown in the following Table:

Table III

| Content of acrylamide in the monomer mixture, | Temperature, | | Time of the hydrolysis | | | | |
|---|---|---|---|---|---|---|---|
| | | | hours | | | | |
| mol % | °C | | 18 | 42 | 106 | 156 | 200 |
| 0.1 | 0 | Conversion of the hydrolysis, mol.% | 1.62 | 3.35 | 7.51 | 15.8 | 18.9 |
| 0.1 | 20 | | 5.6 | 12.8 | 38.5 | 78 | 98.8 |
| 5 | 0 | | 7.8 | 15.4 | 45.0 | 81.1 | 97.1 |
| 5 | 20 | | 10.6 | 21.2 | 51.6 | 85.8 | 99.6 |
| 25 | 0 | | 15.8 | 33.4 | 72.4 | 89.8 | 98.9 |
| 25 | 20 | | 22.0 | 38.9 | 84.5 | 98.8 | 97.6 |

One can see the influence of the initial acrylamide content on the rate of the hydrolysis from the comparison of Tables II and III.

EXAMPLE 3

Two monomer mixtures are prepared.

A. 160 g acrylonitrile, 810 g of 65% nitric acid, 40 g of water, 0.8 g urea and 1.25 ml of 10% aqueous solution of ammonium persulfate.

B. 156.8 g acrylonitrile, 3.2 g acrylamide, 810 g of 65% nitric acid, 40 g of water, 0.80 g urea and 1.25 ml of 10% aqueous solution of ammonium persulfate.

Solutions A and B are kept in glass vessels at 22°C, under a protective atmosphere (carbon dioxide) for 12 hours. After which time the viscosity of the solutions increases markedly; the solutions are thereafter transferred into spinning pipettes. Samples are taken at certain time intervals by extruding a part of the solution into an excess of water and forming an isotropic filament. The filaments are dried for 48 hours at 50°C in vacuo (5 mm Hg) and swelled again in distilled water to eliminate the influence of the heterogeneity in the determination of the swelling capacity in water. The swelling capacity is determined by weighing the dry and the swelled sample, the conversion by hydrolysis is determined by means of elementary analysis (taken as the decrease of the number of the nitrile groups). The results are set forth in the following Table:

Table IV

| Solution | Time from the beginning of the polymerization, hours | | | | | | | | |
|---|---|---|---|---|---|---|---|---|---|
| | 84 | 96 | 108 | 120 | 132 | 144 | 156 | 180 | 204 |
| A- content of water % by weight conversion of the hydrolysis mol.% | 4.2 | 7.8 | 9.0 | 13.5 | 14.2 | 24.0 | 35.5 | 41.0 | 49.8 |
| | 7.7 | 10.1 | 15.2 | 20.8 | 22.1 | 38.0 | 51.3 | 56.8 | 75.0 |

Table IV-continued

| Solution | Time from the beginning of the polymerization, hours | | | | | | | |
|---|---|---|---|---|---|---|---|---|
| B- content of water % by weight | 6.4 | 8.5 | 12.3 | 17.8 | 25.1 | 38.6 | 48.6 | 63.2 | 66.8 |
| conversion of the hydrolysis mol.% | 8.6 | 13.3 | 20.0 | 29.1 | 41.8 | 57.5 | 73.0 | 82.2 | 86.2 |

It is obvious from the above results that the addition of 2% by weight of acrylamide to the initial mixture affords for a saving of about 12 hours in achieving the desired degree of hydrolysis.

EXAMPLE 4 a. 23.1 parts acrylonitrile, 76.8 parts concentrated aqueous solution of zinc chloride, 0.01 part potassium pyrosulfite and 0.03 p ammonium persulfate are mixed at −30°C and poured into a mold (formed by two glass plates with 1.75 mm thick silicone rubber gasket in between).

When the polymerization is finished, the foil thus formed is heated to 80°C. Strips of it are then cut off as samples at varying intervals of time. The samples are washed with water and their swelling capacity determined, taken as the weight ratio of dry and swelled sample. The samples are marked as A.

b. The lyogel foil is prepared in the same way from the following batch:

21.9 parts acrylonitrile, 1.2 parts acrylamide, 76.9 parts concentrated aqueous solution of zinc chloride, 0.01 part potassium pyrosulfite and 0.03 part ammonium persulfate.

The samples, marked B, are treated in the same manner as the samples marked A in the previous case. The results are shown in the following Table:

Table V

| | Time of heating to 80°C minutes | | | | | | | |
|---|---|---|---|---|---|---|---|---|
| | 10 | 20 | 30 | 40 | 50 | 60 | 70 | 80 |
| Swelling capacity of samples A | 1.52 | 1.85 | 1.90 | 2.01 | 2.05 | 3.25 | 8.38 | 17.52 |
| Swelling capacity of samples B | 2.55 | 6.28 | 10.13 | 14.65 | 22.0 | 28.32 | — | — |

It is apparent from the comparison of samples A and B that the process according to the present invention is accelerated and that about a 1 hour lasting induction period is eliminated.

Since it is obvious that numerous changes and modifications can be made in the above-described details without departing from the spirit and nature of the invention, it is to be understood that all such changes and modifications are included within the scope of the invention.

What is claimed:

1. A method of preparing hydrophilic polymers of acrylonitrile comprising the steps of copolymerizing acrylonitrile with about 0.01 to about 30% by weight of a monomer selected from the group consisting of monomers of the formula $CH_2=CRCONHR^1$, wherein R is hydrogen or methyl and $R^1$ is hydrogen, methyl or ethyl, N,N-dialkylacrylamides and methacrylamides and N-alkylolacrylamides and methacrylamides, thereafter subjecting said polymer to treatment with 50 to 95% by weight based on the copolymer of an aqueous acidic hydrolytic agent (b) selected from the group consisting of 40 to 75% nitric acid, 60 to 95% sulfuric acid, and 40 to 95% aqueous zinc chloride solution containing 0.001 to 10% of anhydrous hydrogen chloride, at a temperature between about −25° to 50°C for a period of time sufficient to effect partial homogeneous hydrolysis of said polymer and to convert 1 to 98% of the original nitrile groups into amido groups, and subsequently isolating the product thus formed by separating the acidic hydrolytic agent therefrom.

2. A method as defined in claim 1 wherein component (a) is acrylamide or methacrylamide.

3. A method as defined in claim 1 wherein component (a) has the formula $CH_2=CRCONHR^1$.

4. A method as defined in claim 1 wherein unit (b) is included in amounts of 70 to 95% by weight.

5. A method as defined in claim 1 wherein component (b) is about 40–75% nitric acid solution or greater than about 55% solution of zinc chloride.

6. A method as defined in claim 1 wherein component (a) is an aqueous solution of zinc chloride and HCl.

7. A method as defined in claim 6 carried out in the presence of gaseous HCl.

8. A method as defined in claim 6 wherein the concentration of zinc chloride is about 60% in said aqueous solution.

9. A method as defined in claim 1, wherein said copolymer is prepared by aqueous precipitation copolymerization in absence of substantial amount of nonaqueous solvent for the copolymer, and said copolymer is dissolved in the said hydrolytic agent and thereafter subjected to hydrolysis.

10. A method as defined in claim 1 wherein the hydrolysis is performed at a temperature of about −10°C to about +20°C.

11. A method as defined in claim 9 wherein the said hydrolytic agent is removed by coagulating the same in an aqueous solution.

12. A method as defined in claim 11 wherein said aqueous solution is dilute.

13. A method as defined in claim 11, wherein said hydrolytic agent is removed by washing the same in dilute aqueous solutions of compounds operative to neutralize said hydrolytic agent.

14. A method as defined in claim 13 wherein said dilute aqueous solutions are operative to precipitate said hydrolytic agent.

* * * * *